United States Patent
Barbu et al.

(10) Patent No.: US 9,042,468 B2
(45) Date of Patent: May 26, 2015

(54) CHANNEL ESTIMATION TECHNIQUE

(71) Applicants: Oana-Elena Barbu, Aalborg (DK); Guillaume Damien Andre Monghal, Aalborg (DK); Christian Rom, Aalborg (DK); Bernhard H. Fleury, Aalborg (DK); Niels Lovmand Pedersen, Aalborg (DK); Carles Navarro Manchon, Aalborg (DK)

(72) Inventors: Oana-Elena Barbu, Aalborg (DK); Guillaume Damien Andre Monghal, Aalborg (DK); Christian Rom, Aalborg (DK); Bernhard H. Fleury, Aalborg (DK); Niels Lovmand Pedersen, Aalborg (DK); Carles Navarro Manchon, Aalborg (DK)

(73) Assignee: Intel Mobile Communications GmbH, Neubiberg (DE)

( * ) Notice: Subject to any disclaimer, the term of this patent is extended or adjusted under 35 U.S.C. 154(b) by 0 days.

(21) Appl. No.: 13/929,355

(22) Filed: Jun. 27, 2013

(65) Prior Publication Data

US 2015/0003542 A1      Jan. 1, 2015

(51) Int. Cl.
*H04K 1/10* (2006.01)
*H04L 25/02* (2006.01)
*H04L 5/00* (2006.01)

(52) U.S. Cl.
CPC ........ *H04L 25/0202* (2013.01); *H04L 25/0212* (2013.01); *H04L 25/022* (2013.01); *H04L 25/024* (2013.01); *H04L 5/0023* (2013.01); *H04L 5/0048* (2013.01)

(58) Field of Classification Search
CPC . H04L 25/0212; H04L 25/022; H04L 25/024; H04L 25/0242; H04L 25/03159; H04L 5/0023; H04L 5/0048
USPC ......................................... 375/260, 229, 267
See application file for complete search history.

(56) References Cited

U.S. PATENT DOCUMENTS

| | | | |
|---|---|---|---|
| 8,665,971 B2 * | 3/2014 | Abrishamkar et al. | 375/260 |
| 8,666,000 B2 * | 3/2014 | Eliaz et al. | 375/341 |
| 8,755,618 B2 * | 6/2014 | Thoreau et al. | 382/238 |
| 2014/0140375 A1 * | 5/2014 | Muqaibel et al. | 375/146 |

OTHER PUBLICATIONS

Pedersen, et al., "Application of Bayesian Hierarchical Prior Modeling to Sparse Channel Estimation," Department of Electronic Systems, Aalborg University, Apr. 3, 2012.
Edfors, et al., "OFDM Channel Estimation by Singular Value Decomposition," IEEE Transactions on Communications, vol. 46, No. 7, Jul. 1998.

(Continued)

*Primary Examiner* — Dhaval Patel
(74) *Attorney, Agent, or Firm* — Schiff Hardin LLP

(57) ABSTRACT

A method includes determining a sequence of first coefficient estimates of a communication channel based on a sequence of pilots arranged according to a known pilot pattern and based on a receive signal, wherein the receive signal is based on the sequence of pilots transmitted over the communication channel. The method further includes determining a sequence of second coefficient estimates of the communication channel based on a decomposition of the first coefficient estimates in a dictionary matrix and a sparse vector of the second coefficient estimates, the dictionary matrix including filter characteristics of at least one known transceiver filter arranged in the communication channel.

16 Claims, 5 Drawing Sheets

(56) References Cited

OTHER PUBLICATIONS

Cotter, et al., "Sparse Channel Estimation via Matching Pursuit With Application to Equalization," IEEE Transactions on Communications, vol. 50, No. 3, Mar. 2002.

Michael Tipping, "An Efficient Matlab Implementaion of the Sparse Bayesian Modelling Algorithm (Version 2.0)," Vector Anomaly, Mar. 12, 2009.

Michael Tipping, "Sparse Bayesian Learning and the Relevance Vector Machine," Journal of Machine Learning Research 1, 211-244, 2001.

* cited by examiner

US 9,042,468 B2

CHANNEL ESTIMATION TECHNIQUE

TECHNICAL FIELD

Embodiments described herein generally relate to a technique for determining channel coefficients estimates of a communication channel, in particular second coefficient estimates based on a decomposition of first coefficient estimates into a dictionary matrix and a sparse vector.

BACKGROUND

Many channel models proposed for wireless communication systems characterize the channel impulse response (CIR) as being sparse in the delay domain, i.e. a sum of a few dominant multi-path components, each associated with a delay and a complex gain. Based on this channel property, estimation techniques employing compressed sensing and sparse channel representations may be used to reconstruct the channel. However, the channel observed by the receiver may include the wireless propagation channel together with other effects at the transmitter and receiver side, such as antenna responses or non-ideal pulse-shaping transceiver filters. Due to these effects, the overall channel as seen by the receiver might not be purely sparse in the delay domain. In reality, the CIR experienced at the receiver may be a composite response that includes, in addition to the true CIR, the CIRs of the OFDM (Orthogonal Frequency Division Multiplex) RF (Radio Frequency) transmit (TX) and receive (RX) shape filters. The RF shape filters may interact with the coefficients of the true CIR, e.g. by introducing a leakage in the composite CIR around the true components of the CIR. For example, in LTE (Long Term Evolution) systems, this effect may be significant given the typical transmission bandwidth on the order of 10 MHz.

BRIEF DESCRIPTION OF THE DRAWINGS

The accompanying drawings are included to provide a further understanding of aspects of the disclosure and are incorporated in and constitute a part of this specification. The drawings illustrate aspects and together with the description serve to explain principles of aspects. Other aspects and examples and many of the intended advantages of aspects and examples will be readily appreciated as they become better understood by reference to the following detailed description. Like reference numerals designate corresponding similar parts.

DESCRIPTION OF EMBODIMENTS

Figure 1:
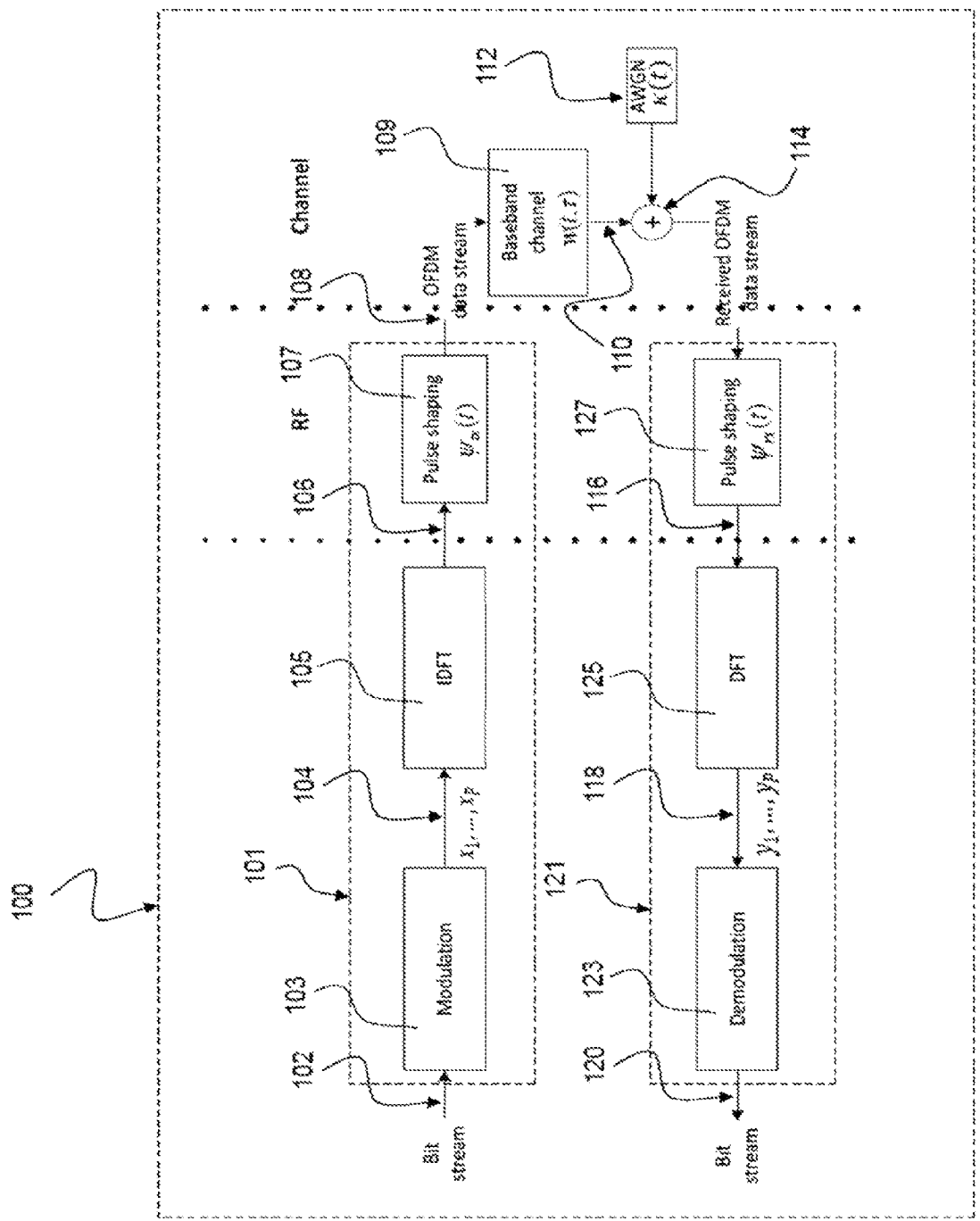
FIG. 1 illustrates an example of an OFDM system including transceiver shape filters.

The aspects and examples are described with reference to the drawings, wherein like reference numerals are generally utilized to refer to like elements throughout. In the following description, for purposes of explanation, numerous specific details are set forth in order to provide a thorough understanding of one or more aspects or examples. It may be evident, however, to one skilled in the art that one or more aspects or examples may be practiced with a lesser degree of the specific details. In other instances, known structures and elements are shown in schematic form in order to facilitate describing one or more aspects or examples. It is to be understood that other examples may be utilized and structural or logical changes may be made without departing from the scope of the disclosure.

In addition, while a particular feature or aspect of an example may be disclosed with respect to only one of several implementations, such feature or aspect may be combined with one or more other features or aspects of the other implementations as may be desired and advantageous for any given or particular application. Furthermore, to the extent that the terms "include", "have", "with" or other variants thereof are used in either the detailed description or the claims, such terms are intended to be inclusive in a manner similar to the term "comprise". The terms "coupled" and "connected", along with derivatives may be used. It should be understood that these terms may be used to indicate that two elements co-operate or interact with each other regardless whether they are in direct physical or electrical contact, or they are not in direct contact with each other. Also, the term "exemplary" is merely meant as an example, rather than the best or optimal. The following detailed description, therefore, is not to be taken in a limiting sense, and the scope of the present disclosure is defined by the appended claims.

The devices and methods as described herein can be utilized as part of and for radio transmission systems, namely for systems operating in the OFDM mode. The devices disclosed may be embodied in baseband segments of devices used for the transmission or reception of OFDM radio signals, in particular base stations, relay stations, mobile phones, hand-held devices or other kinds of mobile radio receivers. The described devices may be employed to perform methods as disclosed herein, although those methods may be performed in any other way as well.

The following description may be read in connection with any kind of multiple carrier radio transmission systems, in particular any mobile communications systems employing multiple carrier modulation, such as, for example, the Universal Mobile Telecommunications System (UMTS) Standard or the Long Term Evolution (LTE) Standard.

The following description may also be read in connection with multiple carrier radio transmission systems in the field of digital video broadcasting (DVB-T/H) which is based on terrestrial transmitters and a communication system design adapted for mobile or hand-held receivers. However, also other communications systems, for example, satellite OFDM systems or digital subscriber line (DSL) systems, may benefit from the concepts and principles outlined herein.

The methods and devices as described herein may be utilized with any sort of antenna configurations employed within the multiple carrier radio transmission system as described herein. In particular, the concepts presented herein are applicable to radio systems employing an arbitrary number of transmit and/or receive antennas, that is Single Input Single Output (SISO) systems, Single Input Multiple Output (SIMO) systems, Multiple Input Single Output (MISO) systems and Multiple Input Multiple Output (MIMO) systems.

Referring to FIG. 1, an example of an OFDM system 100 including transceiver shape filters 107, 127 is shown.

The OFDM system 100 may include an OFDM transmitter 101 and an OFDM receiver 121. A TX bit stream 102 may pass the OFDM transmitter 101 providing a TX-filtered OFDM data stream 108 which may be transmitted over a transmission channel w(t,τ) 109, e.g. a baseband channel, providing a transmitted OFDM data stream 110 which may be distorted by a distortion κ(t), e.g. additive white Gaussian noise, and may be received as received OFDM data stream 114 at the OFDM receiver 121 which may provide an RX bit stream 120.

The OFDM transmitter 101 may include a modulator 103, an IDFT transformer 105 and a TX pulse shape filter 107. The TX bit stream 102 may be modulated by the modulator 103 providing a modulated TX data stream 104 which may be transformed into time domain by the IDFT (Inverse Discrete Fourier Transform) transformer 105, e.g. a unit performing an inverse Discrete Fourier Transform or an inverse Fast Fourier Transform or any other frequency-time transform, providing an unfiltered OFDM TX data stream 106. The unfiltered OFDM TX data stream 106 may pass the TX pulse shape filter 107 providing the TX-filtered OFDM data stream 108.

The OFDM receiver 121 may include a demodulator 123, a DFT (Discrete Fourier Transform) transformer 125 and an RX pulse shape filter 127. The TX-filtered OFDM data stream 108 may be filtered by the RX pulse shape filter 127 providing an RX OFDM data stream 116 which may be transformed into frequency domain by the DFT transformer 125, e.g. a unit performing a Discrete Fourier Transform or a Fast Fourier Transform or any other time-frequency transform, providing a modulated RX data stream 118 which may be demodulated by the demodulator 123 providing the RX bit stream 120.

In one example, the OFDM system 100 may be a single-input single-output OFDM system and can be described according to the following. The message 102 may consist of a vector $u=[u_0, \ldots, u_{N_B-1}]$ of information bits which may be encoded with a code rate $R=N_B/N_C$ and interleaved into the vector $c=[c_0, \ldots, c_{N_C-1}]$. The encoded message may then be modulated 103 onto a set of complex symbols $x^{(D)}=[\bar{x}_0^{(D)}, \ldots, x_{N_D-1}^{(D)}]^T$. The data symbols may be interleaved with the pilot symbols 104 from the vector $x^{(P)}=[x_0^{(P)}, \ldots, x_{N_P-1}^{(P)}]^T$. The overall modulated message to be sent may then be $x=[x_0, \ldots, x_{N-1}]^T$ defined as $$x_i = \begin{cases} x_j^{(P)} & \text{if } i \in P, p_j = i \\ x_j^{(D)} & \text{if } i \in D, d_j = i \end{cases} \quad (1)$$

where $P = \{p_0, \ldots, p_{N_{P-1}}\}$ and $D = \{d_0, \ldots, p_{N_{D-1}}\}$ may represent the subsets of pilot and respectively data indices so that $\mathcal{P} \cup \mathcal{D} = \{0, \ldots, N-1\}$, $\mathcal{P} \cap \mathcal{D} = \emptyset$, $|\mathcal{P}|=N_P$, $|\mathcal{D}|=N_D$ and, $N=N_D+N_P$. The symbols may be passed through an inverse DFT (Inverse Discrete Fourier Transform) block 105, yielding $$s = \mathcal{F}^H x = [s_0, \ldots, s_{N-1}]^T. \quad (2)$$

Next, the resulting samples may be appended a p-samples long cyclic prefix (CP) and may be modulated by a transmitting pulse-shaping filter $\psi_{tx}$ 107 in order to obtain the continuous OFDM signal $$s(t) = \sum_{n=-\mu}^{N-1} s_n \psi_{tx}(t - nT_s), \, t \in [-\mu T_s, NT_s] \quad (3)$$

where $T_s$ represents the sampling time and $\psi_{tx}(t):[0,T] \to \mathbb{R}$; $T=\alpha T_s$, $\alpha > 0$. The signal 108 may then be sent through the wireless channel 109 with the channel impulse response (CIR) modelled as a sum of L multipath components, associated with the complex gains $\beta=[\beta_0, \ldots, \beta_{L-1}]^T$ and, delays $\tau=[\tau_0, \ldots, \tau_{L-1}]^T$. The CIR may be considered invariant throughout the duration of one OFDM symbol, i.e.

$$g(\tau) = \sum_{l=0}^{L-1} \beta_l \delta(\tau - \tau_l). \quad (4)$$

At the reception, the signal z(t) may appear as the convolution of the transmitted signal (3) and the CIR (4) corrupted by additive white Gaussian noise 112 (AWGN) n(t):

$z(t)=(s*g)(t)+n(t).$

The signal may next be passed through a receiving pulse-shaping filter $\psi_{rx}$ 127, at the output of which the signal 116 is $$r(t) = (z * \psi_{rx})(t) = (s * g * \psi_{rx})(t) + v(t) \quad (5)$$
$$= \sum_{n=-p}^{N-1} s_n(\psi_{tx} * g * \psi_{rx})(t - nT_s) + v(t)$$

where $\psi_{rx}(t):[0,T] \to \mathbb{R}$; and, $v(t)=(n*\psi_{rx})(t)$. Next, the received signal may be sampled and the CP may be discarded $$r_k = r(kT_s) = \sum_{n=-p}^{N-1} s_n q((k-n)T_s) + v(kT_s), \quad (6)$$

Figure 2:
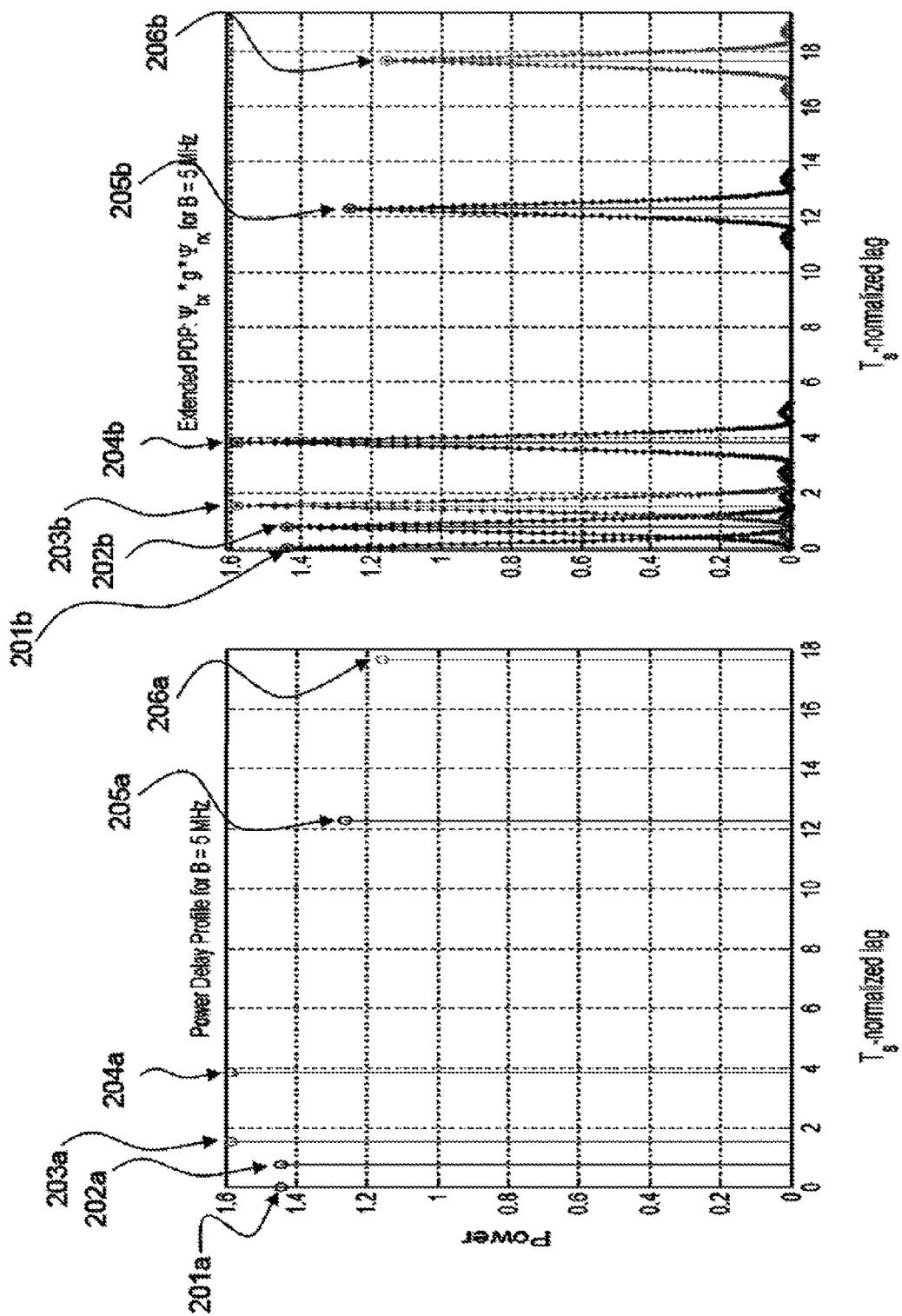
FIG. 2 illustrates an exemplary channel impulse response affected by radio frequency transceiver filters.

$\forall k \in [0: N-1]$ where $q(t) = (g * \psi_{tx} * \psi_{rx})(t) = (g * \phi)(t): \; [0, \tau_{L-1} + 2T] \to \mathbb{R},$ with $\phi(t) = (\psi_{tx} * \psi_{rx})(t): \; [0, 2T] \to \mathbb{R}.$ In order to avoid inter-symbol interference, it should be ensured that $r_k=0, \forall k > N+\mu \Leftrightarrow q((k-n)T_s)=0, \forall k-n \geq \mu+1.$ Next, the discrete time samples of the received signal $r=[r_0, \ldots, r_{N-1}]^T$ may be passed through the DFT block 125, yielding $$y = \mathcal{F} r = X\sqrt{N}M\beta + \xi \quad (7)$$

where $X=\text{diag}(x_0, \ldots, x_{N-1})$, $M=F\Phi$, $\xi=Fv$, $v \in \mathbb{C}^N$ and $\Phi \in \mathbb{C}^{N \times L}, \Phi_{n,l} = \phi(nT_s - \eta), \forall n \in [0:N-1], \forall l \in [0:L-1].$ In FIG. 2 the effect of the filters 107, 127 on the CIR for an EPA (extended pedestrian A channel model according to 3GPP TS 36.104 B.2, V8.13.0, Jul. 10, 2012) profile is graphically observed. For large bandwidths, the channel profile exhibits a specular behaviour as the filters decay fast, therefore the incentive is to disregard the filters effects altogether. However, when employing a small bandwidth (e.g. 20 MHz), the filter responses span and determine in turn a span in the overall system response which appears less sparse in the delay domain.

To estimate the channel frequency response, h=Mβ from (7), the $N_P$ pilot symbols can be used, arranged according to the pattern given in $\mathcal{P}$.

In one example, the received signal observed at pilot positions $$y^{(P)} = (y_{p0}, \ldots, y_{px-3})^T$$

may be divided by the corresponding set of transmitted symbols $$X^{(P)} = \text{diag}(x_{p0}, \ldots, x_{px-3}).$$

The observations used for estimating the channel vector may read $$t = [X^{(P)}]^{-1} y^{(P)} = \sqrt{(N)} M^{(P)} \beta + [X^{(P)}]^{-1} \xi^{(P)} \quad (8)$$

where $M^{(P)}$ and $\xi^{(P)}$ may be built by taking the rows of M and ξ, corresponding to the pilot pattern $\mathcal{P}$. The observation t may thus contain the samples of the channel frequency response at the pilots positions corrupted by AWGN samples.

The observation t may thus represent a sequence of first coefficient estimates of the communication channel 109 including the AWGN noise 112 and the pulse shaping filters 107, 127.

Since both the channel vector β and the matrix $M^{(P)}$ in equation (8) may remain unknown, in one example, a compressive sensing approach may be applied as described in the following. For estimating h, the model from (8) may be recasted to the compressive sensing inference model $$t = H\alpha + w \quad (9)$$

where $t \in \mathbb{C}^{N_P}$ represents the set of $N_P$ observations, $w \in \mathbb{C}^{N_P}$ the samples of white Gaussian random noise 112 of zero-mean and covariance $\lambda^{-1}I$, $\lambda > 0$ and, $H \in \mathbb{C}^{N_P \times K}$, $K > N_P$ represents the dictionary matrix; $\alpha = [\alpha_0, \ldots, \alpha_{K-1}]^T$ represents the sparse vector in which a few elements are nonzero.

The goal of compressive sensing may therefore be to estimate a in the approximate CIR model $$\tilde{g}(\tau) = \sum_{k=0}^{K-1} \alpha_k \delta(\tau - k\Delta_\tau), \quad K \gg L \quad (10)$$

where $\Delta_\tau$ represents the resolution of the delay vector $\tau^{(s)} = (\tau_k^{(s)} = k\Delta_\tau | k = [0:K-1])$. The estimated sparse channel vector α may be employed in finding the estimated channel frequency response vector at the pilot positions $\hat{h}^{(P)} = H\hat{\alpha}$.

Therefore, in order to use the sparse channel estimation framework from (9), the underlying system model may be defined based on the available pilot observations (8). For that, the dictionary matrix H may be designed as the DFT (Discrete Fourier Transform) of the convolution of the responses of the two transceiver filters $$H_{j,k} = \sqrt{N} \sum_{n=0}^{N-1} F_{pj,n} \phi(nT_S - \tau_k^{(s)}), \quad (11)$$

$$\forall j \in [0: N_P - 1], \forall k \in [0: K - 1].$$

The result of the SBL algorithm, i.e. the second coefficient estimates, are the channel coefficients estimated as in the expression.

The dictionary design presented by the framework of (11) differs from "simple" approaches, where the dictionary $H_{j,k}$ may read $$H_{j,k} = e^{-j2\pi f_{pj} \tau_k^{(s)}} \quad (12)$$

where $f_{p_j}$ denotes the frequency of the pilot subcarrier $p_j$.

By expanding the dictionary matrix H row-wise for all the N subcarriers, the estimated channel frequency response ĥ may be obtained: $\hat{h} = H_{full}\hat{\alpha}$, $H_{full} \in \mathbb{C}^{N \times K}$. The difference between the two models from (11) and (12) may lie in the degree of sparsity of the solution. By utilizing the dictionary from (11), α may represent an estimate of the wireless propagation channel, while utilizing (12) an estimate of the overall channel response may be obtained (i.e. the wireless propagation channel convolved with the responses of the transceiver filters 107, 127) and therefore a less sparse solution.

In one example, the sparse Bayesian learning (SBL) method may be selected as a use case for the compressive sensing technique applied to channel estimation. SBL applied to the signal model in (8) may aim at finding a channel estimate by $\hat{\alpha}$ assigning a probabilistic model to the prior pdf (probability distribution function) p(α) that may induce sparsity constraints on the solution. For modeling the prior pdf, a Bayesian Hierarchical prior modelling approach, e.g. as described in N. L. Pedersen, C. Navarro Manchon, B. H. Fleury, "A Fast Iterative Bayesian Inference Algorithm for Sparse Channel Estimation", ICC 2013 can be applied as compressive sensing method. The channel estimator can be employed by using the dictionary matrix (11) or (12) as described above.

Sparse estimators like Sparse Bayesian Learning (SBL)-based estimators may take advantage of the sparse nature of the channel to provide a significant performance gain. Sparsity may refer here to the fact that the CIR, e.g. the CIR of the transmission channel 109, may only exhibit a small number of significant multipath components or taps. The goal of SBL may be to estimate the sparse vector $\alpha = [\alpha_0, \ldots, \alpha_{K-1}]^T$, in which only a few elements may be non-zero, from the system model as described above by equation (9), i.e.

$$t = H\alpha + w.$$

In this expression, $t \in \mathbb{C}^{N_P}$ represents the set of $N_P$ measurement samples, also called observations, $H \in \mathbb{C}^{N_P \times K}$, $K > N_P$ represents the dictionary matrix, $w \in \mathbb{C}^{N_P}$ is a perturbation vector. For that, the dictionary matrix H has to be designed.

The OFDM system 100 as depicted in FIG. 1 can be used for the design of the dictionary matrix H of the SBL-based channel estimator. In FIG. 1, $y^{(P)}$ 118 is the vector of received symbols at the subcarriers positions allocated to pilot transmission. The subcarrier indices corresponding to pilot subcarriers may be grouped in the set $\mathcal{P} = \{p_0, \ldots, p_{N_p-1}\}$ where $p_n$ denotes the subcarrier index corresponding to the $n^{th}$ pilot.

The signal received at the pilot subcarriers can be expressed as follows $$y^{(P)} = X^{(P)} F^{(P)} \beta + \xi^{(P)}, \quad (13)$$

where $X^{(P)}$ is a diagonal matrix containing the pilot symbols: $X^{(P)} = \text{diag}(x^{(P)})$.

Re-writing the system, it becomes $$t = T\beta + \xi^{(P)} \quad (14)$$

where

- $t \in \mathbb{C}^{N_P}$ is the vector of Least-Square (LS) estimates of the samples of the channel transfer function at the pilot subcarrier positions: $t = (x^{(P)})^{-1} y^{(P)}$;
- $N_p$ is the number of pilot subcarriers;
- $\beta = [\beta_0, \ldots, \beta_{L-1}]^T$ is the vector of channel complex gains of the L multipath components with the delay values in $\tau = [\tau_0, \ldots, \tau_{L-1}]$;
- $\xi^{(P)} \in \mathbb{C}^{N_P}$ is the vector of additive white Gaussian noise samples;
- $T \in \mathbb{C}^{N_P \times L}$ is a Fourier matrix at the pilot subcarrier positions $m \in [0:N_p-1]$, and tap delay: $\tau_n \in \tau$: $T_{m,l} = e^{31\ j2\pi p_m f_s \tau_l}$, with $f_s$ denoting the subcarrier spacing. Note that the matrix T includes the actual delays of the L multipath components in the CIR.

The design of the SBL-based channel estimator applying the "simple" model as specified above may use the dictionary matrix H from (9) as $$H_{m,k} = e^{-i2\pi p_m f_s \tilde{\tau}_k}, \quad m \in [0:N_P-1], \quad (15)$$

$$\tilde{\tau}_k \in \tilde{\tau} = [\tilde{\tau}_0, \ldots, \tilde{\tau}_{K-1}], k = \overline{0, K-1}, K \gg L$$

where $\tilde{\tau}$ is an arbitrary vector of delays, which, if no prior information is available, can be generated with a given resolution and range.

Note that T maybe built using the true L delays. The matrix H cannot be chosen equal to T, as the real delay values are not necessarily known by the receiver. The design of the dictionary matrix therefore may boil down to the choice of the resolution and range of the delay vector $\tilde{\tau}$. The range should be chosen large enough so to include all the potential delays in the receiver's environment, besides, it may be reasonable to choose it smaller than the cyclic prefix length as the model (14) may be valid for delays smaller than the cyclic prefix. The resolution should be chosen small with respect to the expected gaps between the real delays. The resulting delay grid $\tilde{\tau}$ may be oversampled compared to the real delay vector.

Thus, considering the model in (9), SBL will estimate the sparse vector $\alpha$, i.e where only a few of its elements are non-zero.

The observation t from the model in (9) thus may represent a sequence of first coefficient estimates of the communication channel 109 including the AWGN noise 112 and the pulse shaping filters 107, 127. The dictionary matrix H from (15) includes the effects of the communication channel 109 the AWGN noise 112 and the pulse shaping filters 107, 127.

The "simple" model from (15) may be extended by including the impact of the transceiver filters 107, 127 in the dictionary matrix of the SBL-based channel estimator. Doing so is shown to improve the overall performance of the channel estimator.

The modulated symbols 104 may be passed through the IDFT block 105 $s^{(P)} = F^H x^{(P)}$ and may be modulated by a transmitting filter $\psi_{tx}(t)$ 107 in order to obtain the continuous signal s(t) 108. At reception, the signal z(t) may be passed through a receiving filter $\psi_{rx}(t)$ 127, $r(t) = (z * \psi_{rx})(t)$ and then sampled, obtaining the vector of discrete time samples $r^{(P)}$ 116. The modulated symbols 118 may be obtained at the output of the DFT block 125: $y^{(P)} = F r^{(P)}$.

The signal model at pilot subcarriers positions may read now $$t = M^{(P)} \beta + \xi^{(P)} \quad (16)$$

where $$M^{(P)} = F\Phi, \Phi \in \mathbb{R}^{N \times L}, \Phi_{n,l} = \phi(nT_s - \tau_l), l = \overline{0, L-1}, n = \overline{0, N-1}.$$

$$F \in \mathbb{C}^{N_P \times N}$$

is a DFT matrix with the entries $$F_{m,n} = \frac{1}{\sqrt{N}} e^{-\frac{2\pi i}{N} p_m n}, m \in [0: N_P - 1], n = \overline{0, N-1}.$$

$$\phi(t) = (\psi_{tx} * \psi_{rx})(t)$$

is the convolution of the transmitter and receiver's transceiver filters.

Recasting the model from (16) to the sparse estimator from (9), i.e. by redesign of the dictionary matrix, may result in the modified SBL dictionary matrix $\tilde{H}$ that reads $$\tilde{H} = F\tilde{\Phi} \quad (17)$$

where the entries of the matrix $\tilde{\Phi} \in \mathbb{R}^{N \times K}$ may be defined as $$\tilde{\Phi}_{n,k} = \phi(nT_s - \tilde{\tau}_k), n = \overline{0, N-1}, k = \overline{0, K-1}.$$

The solution as described by equation (17) may include the impact of the RF shape filters 107, 127 in the dictionary matrix of the SBL-based channel estimator. Doing so is shown to improve the overall performance of the channel estimator.

The result of the SBL algorithm, i.e. the second coefficient estimates, are the channel coefficients estimated as in the expression.

Referring to FIG. 2, an exemplary channel impulse response affected by radio frequency transceiver filters is shown. The left part of FIG. 2 illustrates an example of a Composite Channel Impulse Response for a bandwidth of 5 MHz. Six main peaks 201a, 202a, 203a, 204a, 205a, 206a in the channel impulse response can be seen. The right part of FIG. 2 illustrates the channel impulse response when affected by the RF Tx and Rx filters for a bandwidth of 5 MHz. The six main peaks 201b, 202b, 203b, 204b, 205b, 206b in the CIR that correspond to the six main peaks 201a, 202a, 203a, 204a, 205a, 206a depicted in FIG. 2a after transmission over the communication channel are distorted by the RX filters impulse response which impulse response can be approximated by a sin (x)/x function or by a raised-cosine function, for example.

FIG. 2 illustrates the leakage effect of the RF filters on the composite CIR affecting the shape of the OFDM symbols. When these effects are taken into account, the performance of conventional SBL channel estimators may be impaired. By modifying the dictionary matrix of the SBL channel estimator in such a way that it accounts for the leakage effect induced by the RF filters, the performance may be improved as can be seen from FIG. 5 described below.

Figure 3:
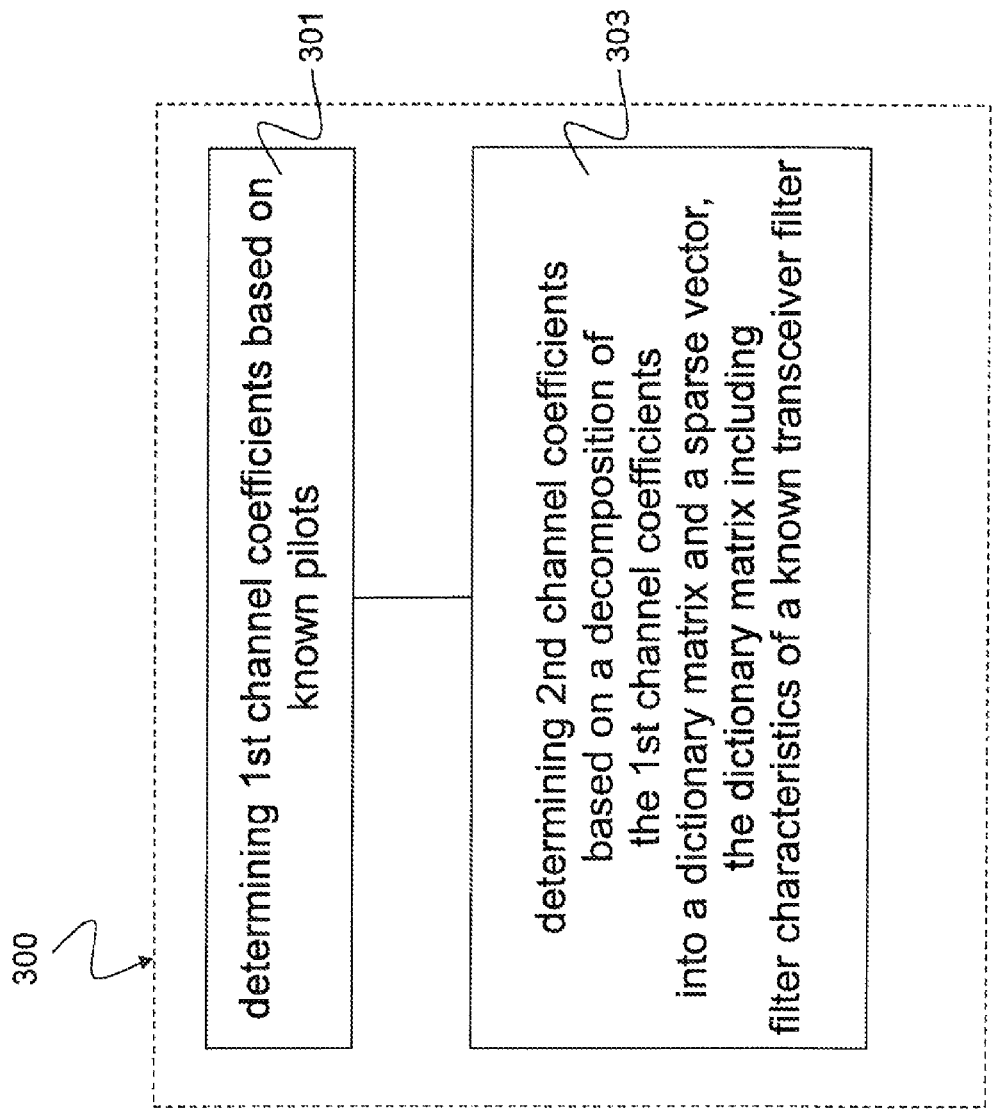
FIG. 3 illustrates a flow diagram of an exemplary method for estimating second channel coefficients based on a decomposition of first channel coefficient estimates.

Referring to FIG. 3, a flow diagram of an exemplary method for estimating second channel coefficients based on a decomposition of first channel coefficient estimates is shown.

The method 300 may include determining 301a sequence of first coefficient estimates of a communication channel based on a sequence of pilots arranged according to a known pilot pattern and based on a received signal, wherein the received signal is based on the sequence of pilots transmitted over the communication channel. The method 300 may further include determining 303 a sequence of second coefficient estimates of the communication channel based on a decomposition of the first coefficient estimates into a dictionary matrix and a sparse vector of the second coefficient estimates, the dictionary matrix including filter characteristics of at least one known transceiver filter arranged in the communication channel.

The sequence of first coefficient estimates of the communication channel may provide a rough estimate of the communication channel including noise, e.g. from an AWGN noise source, and the filters such as antenna responses or non-ideal pulse-shaping transceiver filters or analog-digital filters or digital-analog filters arranged in the communication channel, e.g. according to FIG. 2b. The first coefficient channel estimates, however, do not necessarily represent a sparse CIR. By the decomposition of the first coefficient estimates into a dictionary matrix and a sparse vector of the second coefficient estimates, the non-sparse CIR described by the first channel estimates may be decomposed into a matrix called the dictionary matrix including the filter characteristics and a sparse vector including the second channel estimates which may represent a sparse CIR representing the multipath components of the communication channel without the effects of the filters, e.g. according to FIG. 2a. By applying the decomposition, the dictionary matrix may include the effects of the filters and the sparse vector may be free of such disturbing effects. Therefore, the method may provide a new compressive sensing approach fast converging to the second coefficient estimates which may accurately represent the multipath components of the CIR.

In one example of the method 300, the sequence of second coefficient estimates may be determined at positions of the pilots. Positions of the pilots may be known. Processing complexity can be reduced when only pilot positions have to be computed. In one example of the method 300, the pilots may be encoded together with data symbols according to an orthogonal frequency division multiplex technique. When pilots and data symbols are encoded according to OFDM, the method can be applied to any radio frequency transmission using OFDM symbols, e.g. as defined by the LTE standard. It can even be applied to other standards such as DSL or DVB-T/H using OFDM symbols for transmission. In one example of the method 300, the decomposition may be based on a compressive sensing inference model, in particular a Sparse Bayesian Learning model. The method 300 can be applied in any compressive sensing inference channel modeling, e.g. in SBL channel estimation or in other kinds of channel estimation, thereby improving the effectiveness of such channel estimations.

In one example of the method 300, the dictionary matrix may be determined based on a sequence of time delays generated with a predetermined resolution and range. As the exact time delays of the multipath components are not necessarily known at the receiver, arbitrary time delays can be used for generating the dictionary matrix. The method thus may provide a high degree of flexibility. Choosing a high resolution and a large range for the time delays may provide a very accurate estimation of the channel coefficients while choosing a low resolution and/or a small range for the time delays may provide a rough but fast estimation of the channel coefficients saving computational complexity. In one example of the method 300, the predetermined range may be smaller than a cyclic prefix of an OFDM symbol of the received signal. When the predetermined range is smaller than a cyclic prefix of an OFDM symbol, the resolution of the estimated CIR may have a high accuracy.

In one example of the method 300, the sequence of time delays may be generated based on an oversampled sequence of expected multipath delays of the communication channel. The factor of the oversampling can be adjusted based on accuracy requirements. A high oversampling factor, e.g. a factor of 100, 200, 300, 500 or 1000 may provide high resolution at high precision of the CIR, a low oversampling factor, e.g. a factor of 2, 3, 5, 10, 20 or 50 may provide fast and computationally efficient determination of the CIR. The method thus may provide a high flexibility to the user's requirements. In one example of the method 300, the dictionary matrix may be determined based on a Fourier transform of impulse response coefficients of at least one transceiver filter. A Fourier transform, e.g. a DFT or a FFT may be easy to compute by using standard hardware or software components. As the coefficients of the transceiver filter are known, the Fourier (frequency) coefficients can be preprocessed and may be stored in a memory, e.g. a lookup table to improve computational complexity.

In one example of the method 300, the at least one transceiver filter may include a transmitter radio frequency shape filter and a receiver radio frequency shape filter. The method can be applied in radio communication systems where data pulses may be shaped for optimum transmission over the radio channel. In one example of the method 300, the dictionary matrix may be determined based on a Discrete Fourier Transform matrix of impulse response coefficients of the transmitter filter convolved with impulse response coefficients of the receiver filter. The DFT matrix may describe the frequency characteristics of the communication channel. When a convolution of TX and RX filter coefficients is transformed in frequency domain by the FFT matrix, TX filter coefficients may be first convolved with RX filter coefficients and the resulting time-domain coefficients may be transformed to frequency domain. Alternatively, both, TX filter coefficients and RX filter coefficients may be transformed by the FFT matrix in frequency domain obtaining frequency TX filter coefficients and frequency RX filter coefficients which can then be multiplied in frequency domain. The method thus may provide a high degree of flexibility.

In one example of the method 300, the first coefficient estimates may be based on impulse response coefficients of the communication channel including the at least one transceiver filter. The first coefficient estimates therefore may provide a rough channel estimation which can be used as a starting point by the decomposition to provide the high precision channel estimation of the second coefficient. In one example of the method 300, the second coefficient estimates may be based on impulse response coefficients of the communication channel excluding the at least one transceiver filter. The second coefficient estimates may provide an accurate estimation of the multipath components of the channel free of disturbing effects from the filters. In one example of the method 300, a number of the second coefficient estimates may be smaller than a number of the first coefficient estimates. When the number of the second coefficient estimates is smaller than the number of the first coefficient estimates, the second coefficients may represent a sparse CIR including the multi-paths of the channel, but excluding effects of the transceiver filters in the communication channel.

In one example of the method 300, the decomposition may be based on the following compressive sensing inference model $$t = H\alpha + w,$$

where t denotes the sequence of first coefficient estimates, H denotes the dictionary matrix, α denotes the sparse vector of the second coefficient estimates and w denotes a vector of noise samples. Such a compressive sensing inference model may be easy to compute as only one matrix multiplication has to be computed. The model can be based on pilot transmission.

In one example of the method 300, the dictionary matrix may be determined according to the following relation $$H_{j,k} = \sqrt{N} \sum_{n=0}^{N-1} F_{p_j,n} \phi(nT_S - \tau_k^{(s)}),$$

where $H_{j,k}$ denotes a coefficient of the dictionary matrix with respect to pilot subcarrier index j and time delay index k, $F_{p_j,n}$ denotes a Fourier matrix of the pilots $p_j$ and $\phi(nT_S - \tau_k^{(s)})$ denotes the filter characteristics of the at least one transceiver filter with respect to sampling time $T_S$ and time delay $\tau_k^{(s)}$. Such a dictionary matrix may be easy to compute. When the pilots and the transceiver filters are known, the dictionary matrix can be preprocessed and may be stored, e.g. in a lookup table.

In one example of the method 300, a pulse shaping receiver filter may form a receiving part of the at least one transceiver filter. The transceiver filter may include a receiver filter and a transmitter filter. The receiver filter may include at least one of antenna filter parts, pulse shaping parts, D/A filtering parts and other filtering parts. In one example of the method 300, a Discrete Fourier Transform may be used for transforming the received signal into frequency domain. In one example of the method 300, the dictionary matrix may be determined based on a Fourier operator of the filter characteristics of the at least one transceiver filter with respect to the pilot subcarriers.

The method 300 as illustrated herein may provide a redesign of the dictionary matrix applied for compressive sensing channel estimation, e.g. SBL channel estimation, in order to maintain the sparsity of the pulse-shaped channel. The responses of the transceiver filters in an OFDM LTE system may be appropriately modelled and their effect on the performance of sparse channel estimation techniques may be analysed. Based thereon an improved channel estimator, which can be implemented by applying the method 300, may account for the responses of the pulse-shaping filters yielding more accurate channel estimates.

By constructing a dictionary matrix which accounts for the responses of the pulse-shaping filters, a sparse representation of the channel response may be obtained albeit the diffuseness the filters may introduce. In an example, the sparse Bayesian Learning (SBL) estimator may be used as a compressive sensing method and may be employed by using two different dictionary matrices where one design (called herein the "simple" design) neglects the filters' responses, while the other design (called herein the "modified" or "redesigned" design) may account for the information about the filters. It has shown that the redesigned channel estimator may be robust to mismatches in the parameters of the filter response.

The advantage of the approach applying the method 300 may be that by modifying the dictionary matrix any sparse channel estimator can be used.

Figure 4:
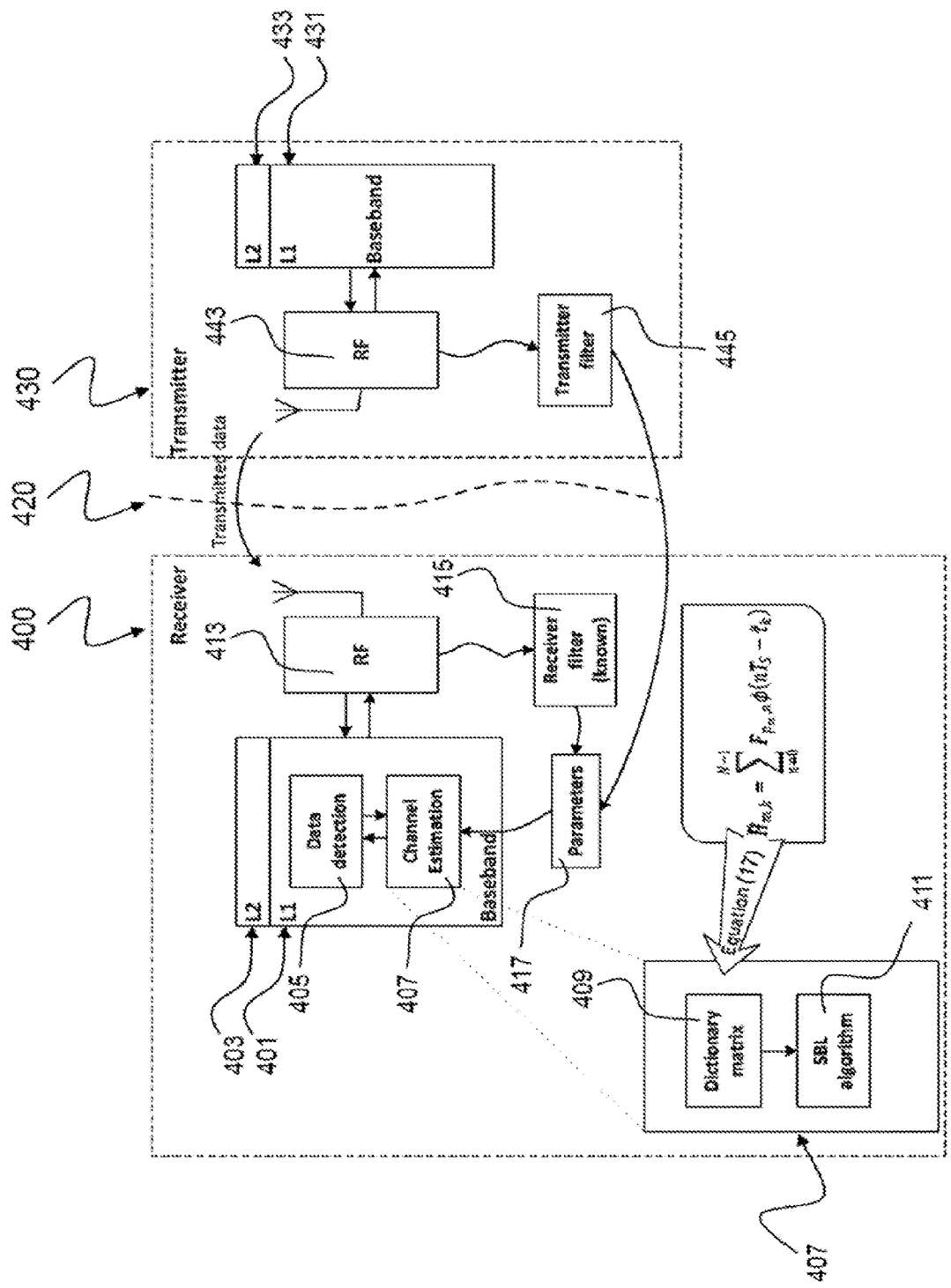
FIG. 4 illustrates an exemplary OFDM transmission system.

Referring to FIG. 4, an exemplary OFDM transmission system is shown. The OFDM transmission system may include an OFDM transmitter 430 transmitting data over a communication channel 420 and an OFDM receiver 400 receiving the transmitted data. The transmitter 430 may include a layer 2 processing unit 433 and a layer 1 (baseband) processing unit 431 interfacing a radio frequency unit 443 providing data to an antenna port which may send the data over the communication channel 420 to the receiver 400. The data may be shaped by a transmitter filter 445 included in the transmitter 430.

The receiver 400 may include a radio frequency unit 413 coupled to an antenna port for receiving transmitted data from the transmitter 430. The receiver 400 may further include a layer 1 processing unit 401, a layer 2 processing unit 403, a parameter unit 417 and a receiver filter 415. The received data may be shaped by the receiver filter 415 with known filter coefficients included in the receiver 400. Some information about the transmitter filter 445 may be considered known, e.g. the receiver filter 415 may be matched to the transmitter filter 445. The layer 1 processing unit 401 may include a channel estimation unit (channel estimator) 407 and a data detection unit 405. The channel estimator 407 may implement an SBL algorithm 411 based on a modified dictionary matrix 409 according to equation (17) described above with respect to FIG. 1

$$H_{m,k} = \sum_{n=0}^{N-1} F_{p_m,n} \phi(nT_S - \tau_k)$$

The performance of this modified SBL based channel estimation is described below with respect to FIG. 5.

Figure 5:
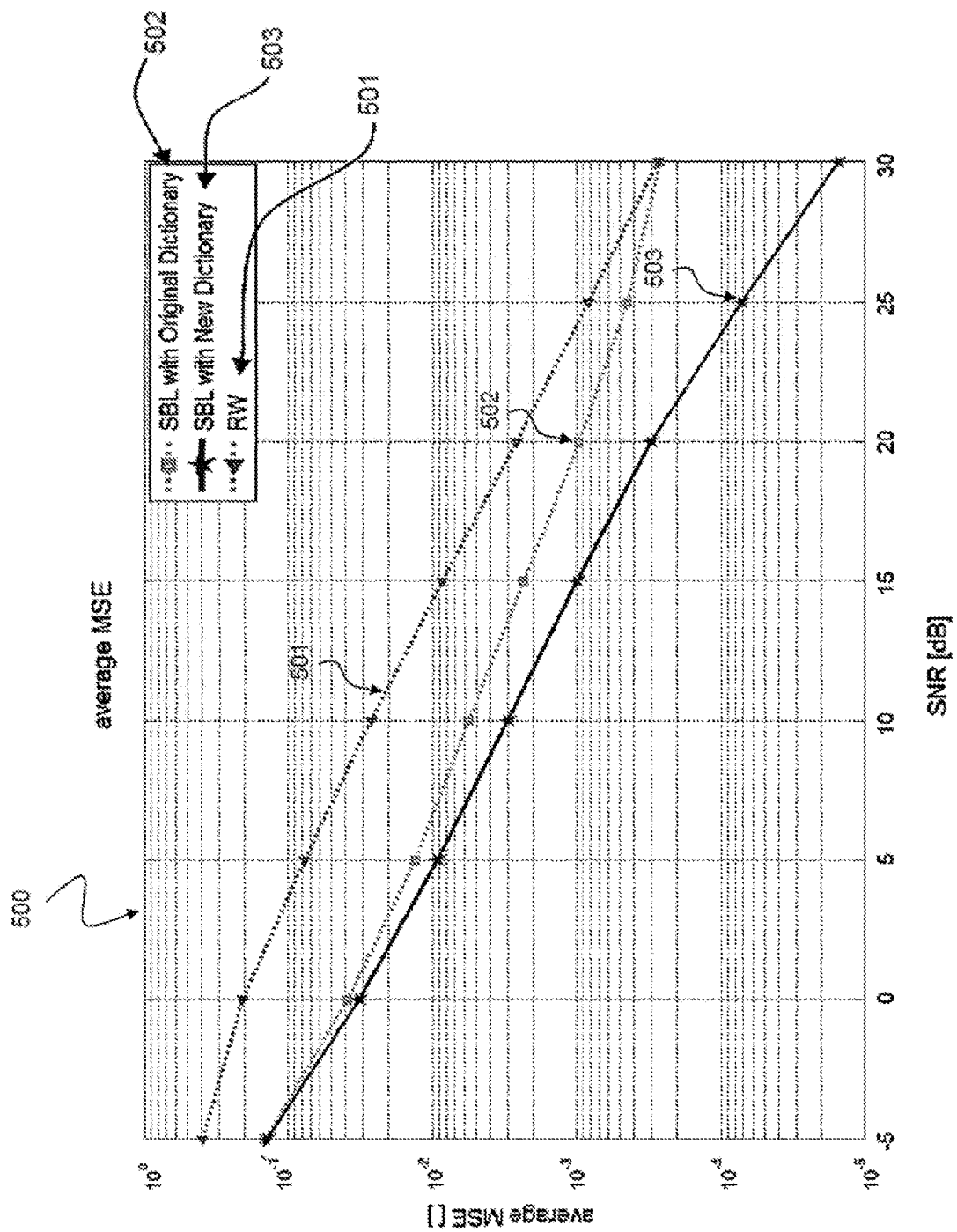
FIG. 5 illustrates a performance diagram of an OFDM transmission system applying different decompositions of first channel coefficient estimates.

Referring to FIG. 5, a performance diagram of a Sparse Bayesian Learning (SBL)-based channel estimation technique applying radio frequency (RF) filtering is shown.

A single-input single-output LTE OFDM setup is used with the settings as specified in Table I. NP=400 pilot symbols/time slot arranged according to the pattern specified in 3GPP TS 36.211, V8.90 is employed. a channel built based on the 3GPP channel models (see 3GPP TS 36.104 V8.13.0, Jul. 10, 2012) is used, consisting of five taps, whose associated delays are randomly generated with a 10 ns resolution in the vicinity of a set of initial delays τinit=[0; 500; 1600; 2300; 3300]ns, at every subframe. The channel is re-instantiated every millisecond and it is considered invariant during 1 OFDM symbol.

At transmission a square-root raised cosine (SRRC) filter is applied with zero-rolloff, of length T=3Ts while at reception, the matched filter is used. This setup serves for testing whether the filters' responses affect the performance of compressive sensing techniques. SBL with two different dictionaries is employed, the "simple dictionary" and the "modified dictionary".

The performance of the SBL in an OFDM system model with RF shape filters according to the representation of FIG. 1 in terms of Minimum Square Error (MSE) is shown in FIG. 5. The SBL estimator is applied both with the "Simple" Dictionary (named in the legend "Original Dictionary")

$$H_{m,k} = e^{-i2\pi p_m f_S \tau_k}$$

and with the modified dictionary matrix (named in the legend "New Dictionary")

$$\tilde{H}_{m,k} = \sum_{n=0}^{N-1} F_{m,n}\bar{\phi}(nT_S - \bar{\tau}_k).$$

The performance is shown against the Robust Wiener Filter (RWF)-based estimator for a bandwidth of 20 MHz in the scenario specified in Table 1.

TABLE 1

Scenario for performance tests of FIG. 5

| | |
|---|---|
| Simulation length [ms] | 100 |
| SNR range [dB] | [−5 0 10 30]; |
| Power Delay Profile (PDP) | Tau = [ 0 500 1600 2300 3300]*1e−9 |
| | PDP = 10.^([−1 0 −3 −5 −7]/10); |
| Channel model | Fixed taps; |
| | Simple complex Gaussian channel |
| | Block fading with persistency of 1 subframe (Δt channel variations) |
| Fs—sampling frequency [kHz] | 15 |
| B [MHz] | 20 (useful B = 18 MHz) |
| CP | Normal |
| Transmission Mode (TM) | 1 |
| Filter types | Square-Root Raised Cosine (SRRC) at transmission, matched filter at reception |
| Roll-off | 0 |

From FIG. 5, the performance of SBL in the aforementioned scenario can be observed. At high SNR, SBL with Original Dictionary 502 which does not possess the information about the filters' responses undergoes a degradation of up to 10 dB in terms of MSE, compared with SBL with New Dictionary 503 which is modelling the effect of the filters in the SBL design. The SBL with New Dictionary 503 may provide a performance improvement: SBL with New Dictionary 503 sees the overall channel response as sparse with respect to the redesigned dictionary and it is able to estimate the correct number of multipath components.

The New Dictionary channel estimator 503 may solve the leakage problem of CIR as described above by incorporating the effect of the responses of the RF shape filters in the dictionary matrix of the SBL-based channel estimator. A clear performance improvement may be observed compared to the original SBL-based channel estimator 502. Moreover, the modified SBL-based channel estimator 503 may clearly outperform the RWF 501 as shown in FIG. 5.

When the filters 107, 127 according to FIG. 1 or the filters 415, 445 according to FIG. 4 are introduced in the system 100, 400 the filter-unaware estimator 502, i.e. the so called "simple dictionary" estimator or "Original Dictionary" estimator, may suffer from performance degradations, a problem which may be remedied by designing a dictionary which uses the filter information 503, the so called "modified dictionary" estimator or "New Dictionary" estimator 503. The redesigned estimator 503 may outperform both the Robust Wiener Filter 501 and the "Original Dictionary" estimator 502 as can be seen from FIG. 5. Moreover, the redesigned estimator 503 may manifest a robust behaviour when the parameters of the transmitter filters 107, 445 are not known at the reception. The RWF performance may remain unchanged throughout the various tests as a result of its design considerations which do not account for the position or number of multipath components. Overall, the effect of the filters 107, 127, 445, 415 is not negligible and a proper design of the SBL estimator by accounting for the filters effects may bring clear performance gains.

EXAMPLES

Example 1 is a method comprising determining a sequence of first coefficient estimates of a communication channel based on a sequence of pilots arranged according to a known pilot pattern and based on a receive signal, wherein the receive signal is based on the sequence of pilots transmitted over the communication channel, and determining a sequence of second coefficient estimates of the communication channel based on a decomposition of the first coefficient estimates into a dictionary matrix and a sparse vector of the second coefficient estimates, wherein the dictionary matrix comprises filter characteristics of at least one known transceiver filter arranged in the communication channel.

In Example 2, the subject matter of Example 1 can optionally include that the sequence of second coefficient estimates is determined at positions of the pilots.

In Example 3, the subject matter of any one of Examples 1-2 can optionally include that the pilots are encoded together with data symbols according to an orthogonal frequency division multiplexing technique.

In Example 4, the subject matter of any one of Examples 1-3 can optionally include that the decomposition is based on a compressive sensing inference model.

In Example 5, the subject matter of any one of Examples 1-4 can optionally include that the decomposition is based on a Sparse Bayesian Learning model.

In Example 6, the subject matter of any one of Examples 1-5 can optionally include that the dictionary matrix is determined based on a sequence of time delays generated with a sequence of time delays determined arbitrarily or by other algorithmic means.

In Example 7, the subject matter of any one of Examples 1-6 can optionally include that the dictionary matrix is determined based on a Fourier transform of impulse response coefficients of the at least one known transceiver filter.

In Example 8, the subject matter of any one of Examples 1-7 can optionally include that the at least one known transceiver filter comprises a transmitter radio frequency shape filter and a receiver radio frequency shape filter.

In Example 9, the subject matter of Example 8 can optionally include that the dictionary matrix is determined based on a Discrete Fourier Transform matrix of impulse response coefficients of the transmitter radio frequency shape filter convolved with impulse response coefficients of the receiver radio frequency shape filter.

Example 10 is a device comprising a first determination unit configured for determining a sequence of first coefficient estimates of a communication channel based on a sequence of pilots arranged according to a known pilot pattern and based on a receive signal, wherein the receive signal is based on the sequence of pilots transmitted over the communication channel, and a second determination unit configured for determining a sequence of second coefficient estimates of the communication channel based on a decomposition of the first coefficient estimates in a dictionary matrix and a sparse vector of the second coefficient estimates, wherein the dictionary matrix comprises filter characteristics of at least one known transceiver filter arranged in the communication channel.

In Example 11, the subject matter of Example 10 can optionally include that the first coefficient estimates are based on impulse response coefficients of the communication channel including the at least one known transceiver filter.

In Example 12, the subject matter of any one of Examples 10-11 can optionally include that the second coefficient estimates are based on impulse response coefficients of the communication channel excluding the at least one known transceiver filter.

In Example 13, the subject matter of any one of Examples 10-12 can optionally include that the decomposition is based on the following compressive sensing inference model:

$$t = H\alpha + w,$$

where t denotes the sequence of first coefficient estimates, H denotes the dictionary matrix, $\alpha$ denotes the sparse vector of the second coefficient estimates and w denotes a vector of noise samples.

In Example 14, the subject matter of any one of Examples 10-13 can optionally include that the dictionary matrix is determined on the basis of the following relation:

$$H_{j,k} = \sqrt{N} \sum_{n=0}^{N-1} F_{p_j,n} \phi(nT_S - \tau_k^{(s)}),$$

where $H_{j,k}$ denotes a coefficient of the dictionary matrix with respect to pilot subcarrier of index j and time delay of index k, $F_{p_j,n}$ denotes a Fourier matrix of the pilots $p_j$ and $\phi(nT_S-\tau_k^{(s)})$ denotes the filter characteristics of the at least one known transceiver filter with respect to sampling time $T_S$ and time delay $\tau_k^{(s)}$.

Example 15 is a receiver comprising an antenna port configured for receiving an OFDM signal transmitted over a radio frequency communication channel, the OFDM signal comprising a sequence of known pilots, a determination unit configured for determining a sequence of first coefficient estimates of the communication channel based on the sequence of pilots and based on the receive signal and configured for determining a sequence of second coefficient estimates of the communication channel based on a decomposition of the first coefficient estimates in a dictionary matrix and a sparse vector of the second coefficient estimates, wherein the dictionary matrix comprises filter characteristics of at least one known transceiver filter arranged in the communication channel.

In Example 16, the subject matter of Example 15 can optionally include a pulse shaping receiver filter configured to form a receiving part of the at least one known transceiver filter.

In Example 17, the subject matter of any one of Examples 15-16 can optionally include that the determination unit comprises a Discrete Fourier Transform unit configured for transforming the received OFDM signal into a frequency domain.

In Example 18, the subject matter of any one of Examples 15-17 can optionally include that the determination unit is configured to determine the dictionary matrix based on a Fourier operator of the filter characteristics of the at least one known transceiver filter with respect to pilot subcarriers.

In Example 19, the subject matter of any one of Examples 10-14 can optionally include that the second determination unit is configured to determine the sequence of second coefficient estimates at positions of the pilots.

In Example 20, the subject matter of any one of Examples 10-14 and 19 can optionally include that the pilots are encoded together with data symbols according to an orthogonal frequency division multiplexing technique.

In Example 21, the subject matter of any one of Examples 10-14 and 19-20 can optionally include that the decomposition is based on a compressive sensing inference model.

In Example 22, the subject matter of any one of Examples 10-14 and 19-21 can optionally include that the decomposition is based on a Sparse Bayesian Learning model.

In Example 23, the subject matter of any one of Examples 10-14 and 19-22 can optionally include that the second determination unit is configured to determine the dictionary matrix based on a sequence of time delays generated with a sequence of time delays determined arbitrarily or by other algorithmic means.

In Example 24, the subject matter of any one of Examples 10-14 and 19-23 can optionally include that the second determination unit is configured to determine the dictionary matrix based on a Fourier transform of impulse response coefficients of the at least one known transceiver filter.

In Example 25, the subject matter of any one of Examples 10-14 and 19-24 can optionally include that the at least one known transceiver filter comprises a transmitter radio frequency shape filter and a receiver radio frequency shape filter.

In Example 26, the subject matter of any one of Examples 10-14 and 19-24 can optionally include that the second determination unit is configured to determine the dictionary matrix based on a Discrete Fourier Transform matrix of impulse response coefficients of the transmitter radio frequency shape filter convolved with impulse response coefficients of the receiver radio frequency shape filter.

In Example 27, the subject matter of any one of Examples 15-18 can optionally include that the determination unit is configured to determine the sequence of second coefficient estimates at positions of the pilots.

In Example 28, the subject matter of any one of Examples 15-18 and 27 can optionally include that the pilots are encoded together with data symbols according to an orthogonal frequency division multiplexing technique.

In Example 29, the subject matter of any one of Examples 15-18 and 27-28 can optionally include that the decomposition is based on a compressive sensing inference model.

In Example 30, the subject matter of any one of Examples 15-18 and 27-29 can optionally include that the decomposition is based on a Sparse Bayesian Learning model.

In Example 31, the subject matter of any one of Examples 15-18 and 27-30 can optionally include that the determination unit is configured to determine the dictionary matrix based on a sequence of time delays generated with a sequence of time delays determined arbitrarily or by other algorithmic means.

In Example 32, the subject matter of any one of Examples 15-18 and 27-31 can optionally include that the determination unit is configured to determine the dictionary matrix based on a Fourier transform of impulse response coefficients of the at least one known transceiver filter.

In Example 33, the subject matter of any one of Examples 15-18 and 27-32 can optionally include that the at least one known transceiver filter comprises a transmitter radio frequency shape filter and a receiver radio frequency shape filter.

In Example 34, the subject matter of any one of Examples 15-18 and 27-33 can optionally include that the determination unit is configured to determine the dictionary matrix based on a Discrete Fourier Transform matrix of impulse response coefficients of the transmitter radio frequency shape filter convolved with impulse response coefficients of the receiver radio frequency shape filter.

Example 35 is a device comprising first means for determining a sequence of first coefficient estimates of a communication channel based on a sequence of pilots arranged according to a known pilot pattern and based on a receive signal, wherein the receive signal is based on the sequence of pilots transmitted over the communication channel, and second means for determining a sequence of second coefficient estimates of the communication channel based on a decomposition of the first coefficient estimates in a dictionary matrix and a sparse vector of the second coefficient estimates, wherein the dictionary matrix comprises filter characteristics of at least one known transceiver filter arranged in the communication channel.

In Example 36, the subject matter of Example 35 can optionally include that the first coefficient estimates are based on impulse response coefficients of the communication channel including the at least one known transceiver filter.

In Example 37, the subject matter of any one of Examples 35-36 can optionally include that the second coefficient estimates are based on impulse response coefficients of the communication channel excluding the at least one known transceiver filter.

In Example 38, the subject matter of any one of Examples 35-37 can optionally include that the decomposition is based on the following compressive sensing inference model:

$$t=H\alpha+w,$$

where t denotes the sequence of first coefficient estimates, H denotes the dictionary matrix, α denotes the sparse vector of the second coefficient estimates and w denotes a vector of noise samples.

In Example 39, the subject matter of any one of Examples 35-38 can optionally include that the dictionary matrix is determined on the basis of the following relation:

$$H_{j,k} = \sqrt{N}\sum_{n=0}^{N-1} F_{p_j,n}\phi(nT_S - \tau_k^{(s)}),$$

where $H_{j,k}$ denotes a coefficient of the dictionary matrix with respect to pilot subcarrier of index j and time delay of index k, $F_{p_j,n}$ denotes a Fourier matrix of the pilots $p_j$ and $\phi(nT_S-\tau_k^{(s)})$ denotes the filter characteristics of the at least one known transceiver filter with respect to sampling time $T_S$ and time delay $\tau_k^{(s)}$.

Example 40 is a receiver comprising means for receiving an OFDM signal transmitted over a radio frequency communication channel, the OFDM signal comprising a sequence of known pilots, means for determining a sequence of first coefficient estimates of the communication channel based on the sequence of pilots and based on the receive signal and configured for determining a sequence of second coefficient estimates of the communication channel based on a decomposition of the first coefficient estimates in a dictionary matrix and a sparse vector of the second coefficient estimates, wherein the dictionary matrix comprises filter characteristics of at least one known transceiver filter arranged in the communication channel.

In Example 41, the subject matter of Example 40 can optionally include means for forming a receiving part of the at least one known transceiver filter.

In Example 42, the subject matter of any one of Examples 40-41 can optionally include that the means for determining comprises means for transforming the received OFDM signal into a frequency domain.

In Example 43, the subject matter of any one of Examples 40-42 can optionally include that the means for determining is configured for determining the dictionary matrix based on a Fourier operator of the filter characteristics of the at least one known transceiver filter with respect to pilot subcarriers.

Example 44 is a computer readable medium on which computer instructions are stored which when executed by a computer, cause the computer to perform the method of one of examples 1 to 9.

Example 45 is a system comprising a first device according to any one of Examples 10 to 14, and a second device configured to transmit the sequence of pilots arranged according to a known pilot pattern.

In Example 46, the subject matter of Example 45 can optionally include that the at least one known transceiver filter comprises a receiver filter implemented in the first device and a transmitter filter implemented in the second device.

In Example 47, the subject matter of any one of Examples 45-46 can optionally include that the first coefficient estimates are based on impulse response coefficients of the communication channel including the at least one known transceiver filter.

In Example 48, the subject matter of any one of Examples 45-47 can optionally include that the second coefficient estimates are based on impulse response coefficients of the communication channel excluding the at least one known transceiver filter.

In Example 49, the subject matter of any one of Examples 45-48 can optionally include that the decomposition is based on the following compressive sensing inference model:

$$t=H\alpha+w,$$

where t denotes the sequence of first coefficient estimates, H denotes the dictionary matrix, α denotes the sparse vector of the second coefficient estimates and w denotes a vector of noise samples.

In Example 50, the subject matter of any one of Examples 45-49 can optionally include that the dictionary matrix is determined on the basis of the following relation:

$$H_{j,k} = \sqrt{N}\sum_{n=0}^{N-1} F_{p_j,n}\phi(nT_S - \tau_k^{(s)}),$$

where $H_{j,k}$ denotes a coefficient of the dictionary matrix with respect to pilot subcarrier of index j and time delay of index k, $F_{p_j,n}$ denotes a Fourier matrix of the pilots $p_j$ and $\phi(nT_S-\tau_k^{(s)})$ denotes the filter characteristics of the at least one known transceiver filter with respect to sampling time $T_S$ and time delay $\tau_k^{(s)}$.

While the disclosure has been illustrated and described with respect to one or more implementations, alterations and/or modifications may be made to the illustrated examples described above. In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the disclosure.

What is claimed is:
1. A method, comprising:
determining a sequence of first coefficient estimates of a communication channel based on a sequence of pilots arranged according to a known pilot pattern and based on a receive signal, wherein the receive signal is based on the sequence of pilots transmitted over the communication channel; and determining a sequence of second coefficient estimates of the communication channel based on a decomposition of the first coefficient estimates into a dictionary matrix and a sparse vector of the second coefficient estimates, wherein the dictionary matrix comprises filter characteristics of at least one known transceiver filter arranged in the communication channel, wherein the second coefficient estimates are based on impulse response coefficients of the communication channel excluding the at least one known transceiver filter.

2. The method of claim 1, wherein the sequence of second coefficient estimates is determined at positions of the pilots.

3. The method of claim 1, wherein the pilots are encoded together with data symbols according to an orthogonal frequency division multiplexing technique.

4. The method of claim 1, wherein the decomposition is based on a compressive sensing inference model, in particular a Sparse Bayesian Learning model.

5. The method of claim 1, wherein the dictionary matrix is determined based on a sequence of time delays generated with a sequence of time delays determined arbitrarily or by other algorithmic means.

6. The method of claim 1, wherein the dictionary matrix is determined based on a Fourier transform of impulse response coefficients of the at least one known transceiver filter.

7. The method of claim 1, wherein the at least one known transceiver filter comprises a transmitter radio frequency shape filter and a receiver radio frequency shape filter.

8. The method of claim 7, wherein the dictionary matrix is determined based on a Discrete Fourier Transform matrix of impulse response coefficients of the transmitter radio frequency shape filter convolved with impulse response coefficients of the receiver radio frequency shape filter.

9. A device, comprising:
a first determination unit configured for determining a sequence of first coefficient estimates of a communication channel based on a sequence of pilots arranged according to a known pilot pattern and based on a receive signal, wherein the receive signal is based on the sequence of pilots transmitted over the communication channel; and a second determination unit configured for determining a sequence of second coefficient estimates of the communication channel based on a decomposition of the first coefficient estimates in a dictionary matrix and a sparse vector of the second coefficient estimates, wherein the dictionary matrix comprises filter characteristics of at least one known transceiver filter arranged in the communication channel, wherein the second coefficient estimates are based on impulse response coefficients of the communication channel excluding the at least one known transceiver filter.

10. The device of claim 9, wherein the first coefficient estimates are based on impulse response coefficients of the communication channel including the at least one known transceiver filter.

11. The device of claim 9, wherein the decomposition is based on the following compressive sensing inference model:

$$t = H\alpha + w$$

where t denotes the sequence of first coefficient estimates, H denotes the dictionary matrix, $\alpha$ denotes the sparse vector of the second coefficient estimates and w denotes a vector of noise samples.

12. The device of claim 9 wherein the dictionary matrix is determined on the basis of the following relation:

$$H_{j,k} = \sqrt{N} \sum_{n=0}^{N-1} F_{p_j,n} \phi(nT_S - \tau_k^{(s)}),$$

where $H_{j,k}$ denotes a coefficient of the dictionary matrix with respect to pilot subcarrier of index j and time delay of index k, $F_{p_j,n}$ denotes a Fourier matrix of the pilots $p_j$ and $\phi(nT_S - \tau_k^{(s)})$ denotes the filter characteristics of the at least one known transceiver filter with respect to sampling time $T_S$ and time delay $\tau_k^{(s)}$.

13. A device, comprising:
a first determination unit configured for determining a sequence of first coefficient estimates of a communication channel based on a sequence of pilots arranged according to a known pilot pattern and based on a receive signal, wherein the receive signal is based on the sequence of pilots transmitted over the communication channel; and a second determination unit configured for determining a sequence of second coefficient estimates of the communication channel based on a decomposition of the first coefficient estimates in a dictionary matrix and a sparse vector of the second coefficient estimates, wherein the dictionary matrix comprises filter characteristics of at least one known transceiver filter arranged in the communication channel, wherein the decomposition is based on the following compressive sensing inference model:

$$t = H\alpha + w,$$

where t denotes the sequence of first coefficient estimates, H denotes the dictionary matrix, $\alpha$ denotes the sparse vector of the second coefficient estimates and w denotes a vector of noise samples.

14. The device of claim 13, wherein the first coefficient estimates are based on impulse response coefficients of the communication channel including the at least one known transceiver filter.

15. The device of claim 13, wherein the second coefficient estimates are based on impulse response coefficients of the communication channel excluding the at least one known transceiver filter.

16. The device of claim 13, wherein the dictionary matrix is determined on the basis of the following relation:

$$H_{j,k} = \sqrt{N} \sum_{n=0}^{N-1} F_{p_j,n} \phi(nT_S - \tau_k^{(s)}),$$

where $H_{j,k}$ denotes a coefficient of the dictionary matrix with respect to pilot subcarrier of index j and time delay of index k, $F_{p_j,n}$ denotes a Fourier matrix of the pilots $p_j$ and $\phi(nT_S - \tau_k^{(s)})$ denotes the filter characteristics of the at least one known transceiver filter with respect to sampling time $T_S$ and time delay $\tau_k^{(s)}$.

* * * * *